United States Patent
Dong et al.

(10) Patent No.: US 10,442,559 B2
(45) Date of Patent: Oct. 15, 2019

(54) MULTI-FUNCTIONAL COMPOSITE STRUCTURE FOR EXTREME ENVIRONMENTS

(71) Applicant: The Boeing Company, Chicago, IL (US)

(72) Inventors: Jian Dong, Irvine, CA (US); Naveed Moayyed Hussain, Palos Verdes Penninsula, CA (US)

(73) Assignee: The Boeing Company, Chicago, IL (US)

( * ) Notice: Subject to any disclaimer, the term of this patent is extended or adjusted under 35 U.S.C. 154(b) by 672 days.

(21) Appl. No.: 15/226,219

(22) Filed: Aug. 2, 2016

(65) Prior Publication Data
US 2018/0037342 A1 Feb. 8, 2018

(51) Int. Cl.
*B64G 1/54* (2006.01)
*B64G 1/56* (2006.01)
(Continued)

(52) U.S. Cl.
CPC ............. *B64G 1/54* (2013.01); *B32B 1/08* (2013.01); *B32B 3/08* (2013.01); *B32B 3/12* (2013.01); *B32B 5/02* (2013.01); *B32B 7/12* (2013.01); *B32B 9/007* (2013.01); *B32B 15/02* (2013.01); *B32B 27/065* (2013.01); *B32B 27/12* (2013.01); *B32B 27/32* (2013.01); *B64C 1/066* (2013.01); *B64C 1/12* (2013.01); *B64C 1/406* (2013.01); *B64G 1/56* (2013.01); *E04B 1/92* (2013.01); *E04C 2/284* (2013.01); *E04C 2/3405* (2013.01); *E04C 2/365* (2013.01); *E04C 2/521* (2013.01);
(Continued)

(58) Field of Classification Search
CPC .... B64G 1/54; B64G 1/56; B32B 1/08; B32B 3/08; B32B 3/12; B32B 5/02; B32B 7/12; B32B 9/007; B32B 15/02; B64C 1/066; B64C 1/12; B64C 1/406
See application file for complete search history.

(56) References Cited

U.S. PATENT DOCUMENTS 3,778,336 A * 12/1973 Adams ................. B21C 23/01
264/29.1
7,484,691 B2 * 2/2009 Kinstler ................. B64G 1/54
174/353
(Continued)

FOREIGN PATENT DOCUMENTS

WO 2012/040217 A1 3/2012

OTHER PUBLICATIONS

European Search Report dated Nov. 17, 2017 issued in co-pending European Patent Application No. 17182390.9.
(Continued)

*Primary Examiner* — Justin M Benedik
(74) *Attorney, Agent, or Firm* — Joseph M. Rolnicki; Evans & Dixon, L.L.C.

(57) ABSTRACT

A multi-functional composite structure has a modular design that can be altered depending on an extreme environment in which the structure will be exposed such as hazardous radiation, micro-meteoroid and orbital debris impacts, extreme temperature changes, etc. The material combinations employed in the multi-functional composite structure provide a supporting structure with low weight and maximum protection from radiation, debris impacts and temperature variations.

21 Claims, 7 Drawing Sheets

(51) Int. Cl.

| | | |
|---|---|---|
| *E04B 1/92* | (2006.01) | |
| *E04C 2/284* | (2006.01) | |
| *E04C 2/34* | (2006.01) | |
| *E04C 2/36* | (2006.01) | |
| *E04C 2/52* | (2006.01) | |
| *B32B 5/02* | (2006.01) | |
| *B32B 7/12* | (2006.01) | |
| *B32B 9/00* | (2006.01) | |
| *B32B 15/02* | (2006.01) | |
| *B32B 27/06* | (2006.01) | |
| *B32B 27/12* | (2006.01) | |
| *B32B 27/32* | (2006.01) | |
| *B32B 1/08* | (2006.01) | |
| *B32B 3/08* | (2006.01) | |
| *B32B 3/12* | (2006.01) | |
| *B64C 1/06* | (2006.01) | |
| *B64C 1/12* | (2006.01) | |
| *B64C 1/40* | (2006.01) | |

(52) U.S. Cl.
CPC ......... *E04C 2/526* (2013.01); *B32B 2250/05* (2013.01); *B32B 2250/40* (2013.01); *B32B 2262/0253* (2013.01); *B32B 2262/0269* (2013.01); *B32B 2262/105* (2013.01); *B32B 2262/106* (2013.01); *B32B 2262/14* (2013.01); *B32B 2266/0278* (2013.01); *B32B 2307/202* (2013.01); *B32B 2307/212* (2013.01); *B32B 2307/304* (2013.01); *B32B 2307/558* (2013.01); *B32B 2307/56* (2013.01); *B32B 2307/71* (2013.01); *B32B 2307/7246* (2013.01); *B32B 2571/02* (2013.01); *B32B 2605/00* (2013.01); *B32B 2605/18* (2013.01); *B64D 2221/00* (2013.01); *E04B 2001/925* (2013.01); *E04C 2002/345* (2013.01)

(56) References Cited

U.S. PATENT DOCUMENTS

| | | | |
|---|---|---|---|
| 8,431,208 B2 * | 4/2013 | Demetriou et al. | |
| 2006/0000186 A1 * | 1/2006 | Carlson | B29C 44/1228 |
| | | | 52/793.1 |
| 2009/0117322 A1 | 5/2009 | Larsen | |
| 2010/0086729 A1 | 4/2010 | Long | |
| 2013/0037656 A1 * | 2/2013 | Messano, Jr. | G21F 3/00 |
| | | | 244/171.7 |

OTHER PUBLICATIONS

Antonella Del Rosso; A Superconducting Shield to Protect Astronauts; CERN Bulletin, Aug. 3, 2015; pp. 1-2; Issue No. 32-33/2015; CERN-1211 Geneva, Switzerland.

* cited by examiner

MULTI-FUNCTIONAL COMPOSITE STRUCTURE FOR EXTREME ENVIRONMENTS

FIELD

This disclosure pertains to a composite structure for extreme environments. More particularly, this disclosure pertains to a multi-functional composite structure having a modular design that can be altered depending on the extreme environment in which the structure will be exposed such as hazardous radiation, micro-meteoroid and orbital debris impacts, extreme temperature changes, etc. The material combinations employed in the multi-functional composite structure provide a supporting structure with low weight and maximum protection from radiation, debris impacts and temperature variations.

BACKGROUND

For individuals working in extreme environments, for example outer space or in handling nuclear materials, it is necessary that the individual be protected from the extreme environment. Sensitive instruments and/or equipment in these extreme environments also need to be protected.

For example, in space a protected accommodation is required to provide shielding from space radiation, including shielding from both ionizing radiation and non-ionizing radiation. Protection from hyperspeed micro-meteoroid and orbital debris (MMOD) impact is also needed. Insulation from extreme temperature variations (from below −200 C to +200 C) is also required. Furthermore, the protective accommodation must have structural integrity to support necessary structural loads.

SUMMARY

The multi-functional composite structure of this disclosure is specifically designed for use in extreme environments. The multi-functional structure includes two or more layers of composite panels with the most outer layer providing high strength and the most inner layer providing a sealed pressure shell.

A support structure is positioned in a space between the composite panel of the outer layer and the composite panel of the inner layer. The support structure is connected to both the composite panel of the outer layer and the composite panel of the inner layer. The support structure has a honeycomb configuration, or a trapezoidal configuration, or some other equivalent configuration. The configuration of the support structure divides the space between the composite panel of the outer layer and the composite panel of the inner layer into a plurality of divided spaces.

Foam fills the plurality of divided spaces between the composite panel of the outer layer and the composite panel of the inner layer. The foam provides the structure with thermal insulation, radiation shielding and energy absorption of orbital debris.

A magnetic repeller is also provided in the space between the composite panel of the outer layer and the composite panel of the inner layer. The magnetic repeller is comprised of super-conducting electrical wire or strips formed in a helix pattern. The plurality of wires or strips extend through the space between the composite panel of the outer layer and the composite panel of the inner layer and when provided with an electric current, the wires or strips function as a magnetic repeller of charged particles to provide protection from (ionizing radiation). When an electric current flows through the super-conductor wire/strip formed in the helix pattern, a magnetic field is generated. The magnetic field provides the protection from the space radiation by repelling the incoming charged particles (ionizing radiation).

Insulation is also provided in the space between the composite panel of the outer layer and the composite layer of the inner layer. The insulation is multi-layer insulation. The insulation provides thermal insulation that prevents temperature variations. The insulation is also radiation shielding insulation that provides additional radiation protection.

In addition to usage in extreme environments such as in outer space or in the handling of nuclear materials, the composite structure can also be used on vehicles requiring blast protection and/or electromagnetic pulse protection, for example military vehicles and aircraft, armored vehicles for personal protection, etc.

The features, functions, and advantages that have been discussed can be achieved independently in various embodiments or may be combined in yet other embodiments, further details of which can be seen with reference to the following description and drawings.

DESCRIPTION

Figure 1:
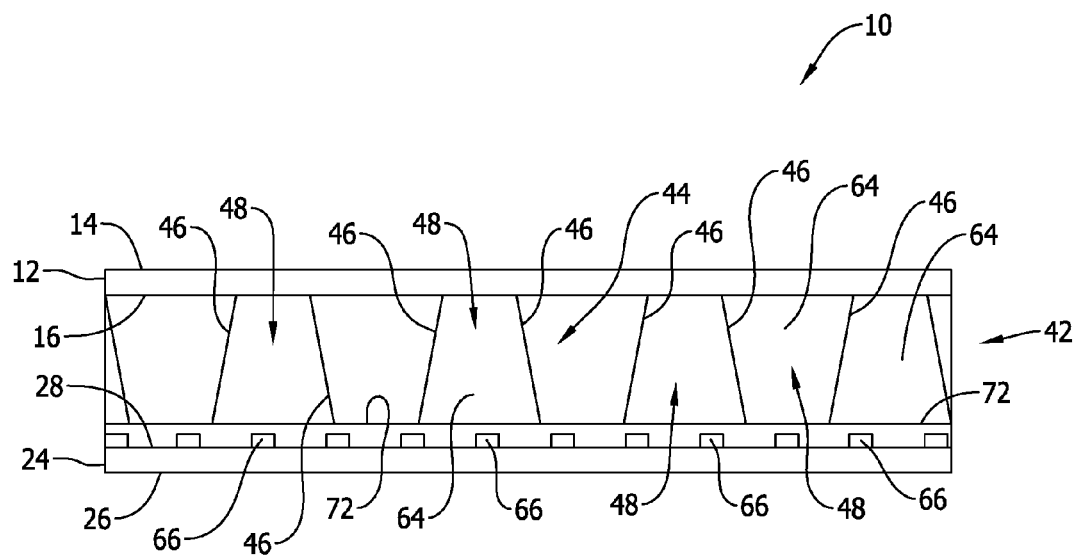
FIG. 1 is a representation of a cross-section view through one side of a portion of the composite structure.
Figure 2:
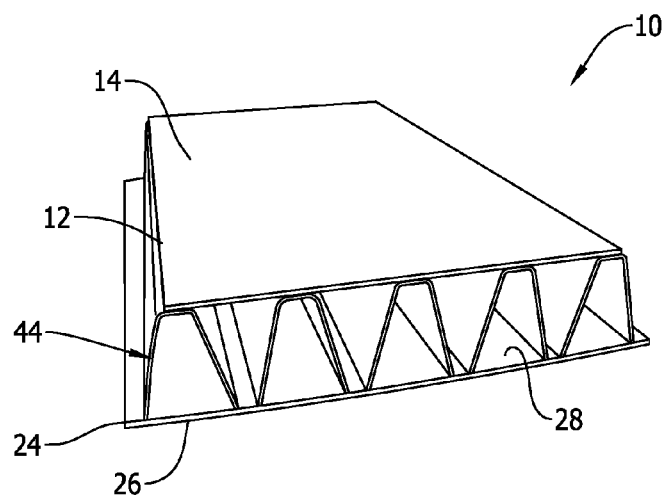
FIG. 2 is a representation of a perspective view of the portion of the composite structure represented in FIG. 1.

FIG. 1 is a representation of a cross-section of a portion of the composite structure 10 of this disclosure. FIG. 2 is a representation of a perspective view of the portion of the composite structure 10 of FIG. 1. In FIGS. 1 and 2, the area above the composite structure 10 is the area of the extreme environment in which the composite structure 10 is designed to be used and the area below the composite structure 10 is the area protected by the composite structure.

Figure 12:
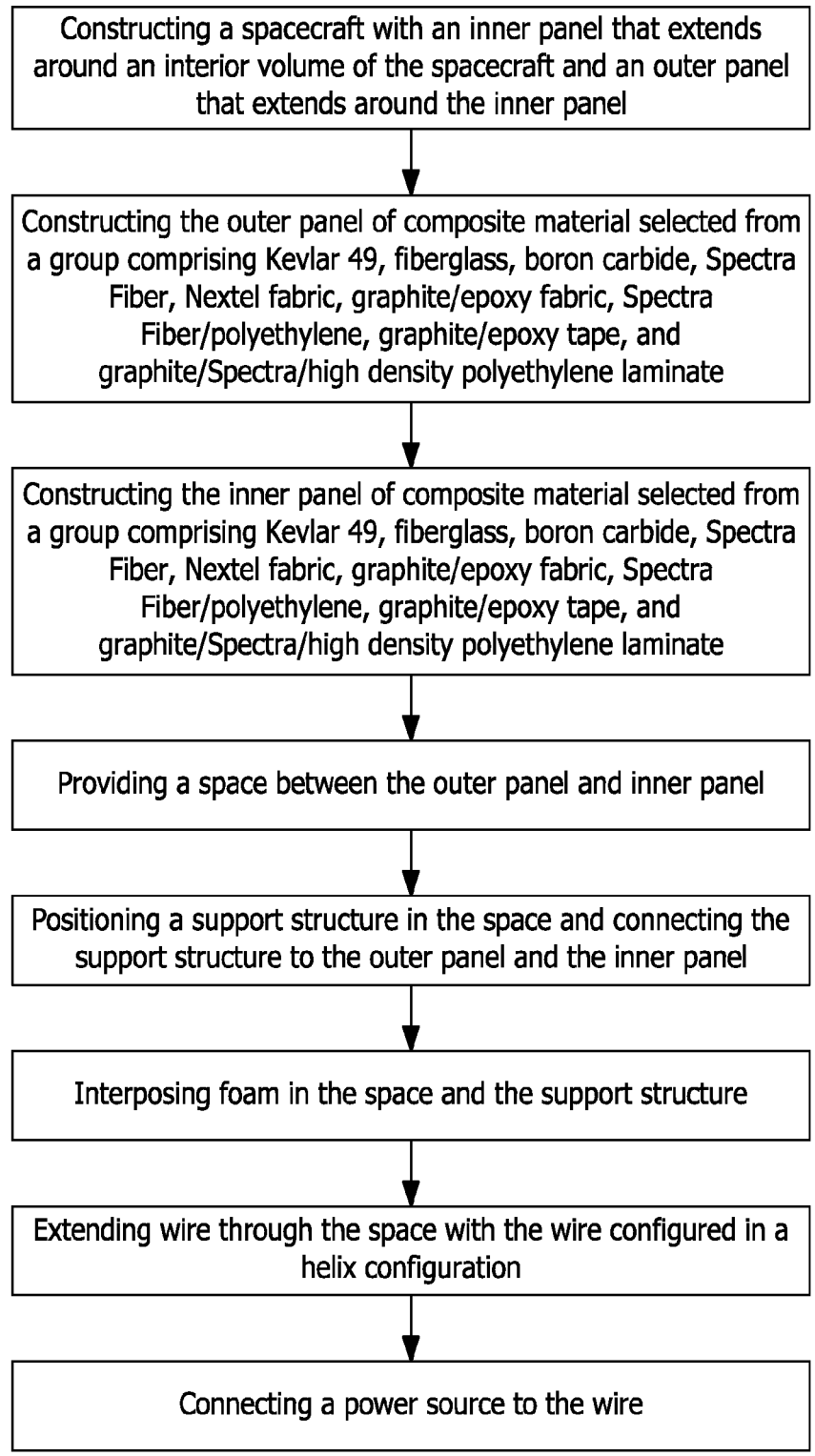
FIG. 12 is a representation of a method of constructing a spacecraft employing the composite structure.

The composite structure 10 is constructed according to the method represented in FIG. 12, with an outer panel 12 that provides high strength and is exposed to the extreme environment. The outer panel 12 has a thickness between an exterior surface 14 and an interior surface 16 of the outer panel. The thickness of the outer panel 12 can be in a range of 0.3 cm to 0.6 cm or more, for example, 0.2 cm to 2.0 cm depending on the type of exterior environment the outer panel 12 is exposed to and the weight and impact resistance requirements of the outer panel 12. The exterior surface 14 of the outer panel 12 and the interior surface 16 of the outer panel 12 are smooth, continuous surfaces. As represented in FIG. 1, the exterior surface 14 of the outer panel 12 and the interior surface 16 of the outer panel 12 are planar and substantially parallel. The surfaces 14, 16 could also be non-planar surfaces such as curved surfaces or other shaped surfaces. For example, when the outer panel 12 is used in the construction of a spacecraft having a cylindrical configuration.

The outer panel 12 is constructed of composite materials. The composite materials of the outer panel 12 are selected from a group comprising Kevlar 49, fiberglass, boron carbide, Spectra Fiber, Nextel fabric, graphite/epoxy fabric, spectra fiber/high density polyethylene (HDPE), graphite/epoxy tape, or other equivalent materials or combinations of equivalent materials such as graphite/spectra/high density polyethylene laminate.

The types of composite materials and the combination of composite materials that go into the construction of the outer panel 12 are dependent on the characteristics of the extreme environment to which the outer panel 12 is exposed. Examples of possible composite materials are shown in the following table listing composite materials, their hydrogen contents by percentage and their material index with materials having larger index numbers providing better radiation protection.

| Shield material | Hydrogen Contents (%) | Materials index (the bigger number, the better radiation protection) |
| --- | --- | --- |
| Polyethylene/Spectra Fiber (Laminate) | 25 | 25 |
| Polyethylene Fiber (Dry Fiber) | 25 | 25 |
| Spectra Fiber/Epoxy (Laminate) | 20 | 20 |
| Kevlar 49/Polyester Fabric (Laminate) | 18.5 | 18 |
| PolyMethacrylImide (PMI) Foam | 16 | 16 |
| Crosslinked Polyethylene Foam | 14.4 | 14 |
| Kevlar 49/Epoxy (Laminate) | 13.5 | 13 |
| Graphite/Polyethylene | 12.5 | 12.5 |
| Aramid Fiber(Dry Fiber) | 12.1 | 12 |
| Polyisocyanurate Foam | 12.1 | 12 |
| Graphite/Epoxy Tape (Laminate) | 7.5 | 7 |
| Graphite/Epoxy Fabric (Laminate) | 7.5 | 7 |
| Boron/Epoxy Laminate (Laminate) | 7.5 | 7 |
| Polyurethane Foam | 4.1 | 4 |
| Polyisocyanurate Foam | 4.1 | 4 |

Figure 3:
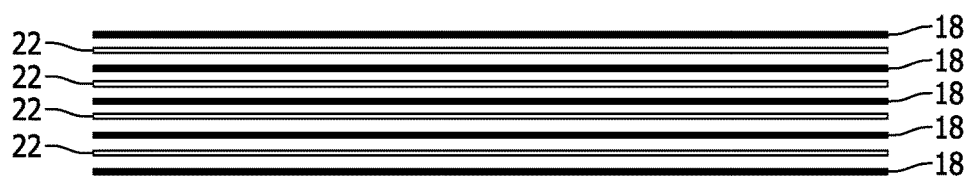
FIG. 3 is a representation of a cross-section of an outer panel of the composite structure.

There are potentially many combinations of the materials listed in the table that can be used to form the outer panel 12. One possible combination of composite materials is represented in FIG. 3. As represented in FIG. 3, the outer panel 12 is comprised of multiple layers of HDPE sheets 18 separated by Spectra Fabric sheets 22. The sheets are joined by resins, adhesives or other equivalent means.

The composite materials of the outer panel 12 are chosen to primarily prevent the penetration or damage of an inner panel 24 on the opposite side of the composite structure 10. The outer panel 12 is designed to absorb most of the energy out of a micro-meteoroid and orbital debris (MMOD) projectile impact with the composite structure 10 and vaporize the MMOD projectile. The outer panel 12 is designed to withstand impacts of MMOD projectiles having diameter dimensions up to 1 cm and speeds varying from 3 km/s to 30 km/s.

The hydrogen content of the composite material chosen to construct the outer panel 12 will also provide extra radiation protection as well as additional thermal insulation and will also increase the structural loads that can be supported by the outer panel 12.

The inner panel 24 of the composite structure 10 is constructed to primarily provide a sealed and temperature/humidity controlled environment inside the composite structure. The inner panel 24 has a thickness between an exterior surface 26 and an interior surface 28 of the inner panel. The thickness of the inner panel 24 can be in a range of 0.2 cm to 0.4 cm or more, for example 0.2 cm to 2.0 cm depending on the type of environment the inner panel 24 is exposed to. The exterior surface 26 of the inner panel 24 and the interior surface 28 of the inner panel 24 are smooth, continuous surfaces. As represented in FIG. 1, the exterior surface 26 of the inner panel 24 and the interior surface 28 of the inner panel 24 are planar and substantially parallel. The surfaces 26, 28 could also be non-planar surfaces such as curved surfaces or other shaped surfaces. For example, when the inner panel 24 is used in the construction of a spacecraft having a cylindrical configuration.

The inner panel 24 is constructed of composite materials such as those listed in the above table. The composite materials of the inner panel 24 are selected from a group comprising Kevlar 49, fiberglass, boron carbide, Spectra Fiber, Nextel fabric, graphite/epoxy fabric, spectra fiber/high density polyethylene (HDPE), graphite/epoxy tape, or other equivalent materials or combinations of equivalent materials such as graphite/spectra/high density polyethylene laminate.

Figure 4:
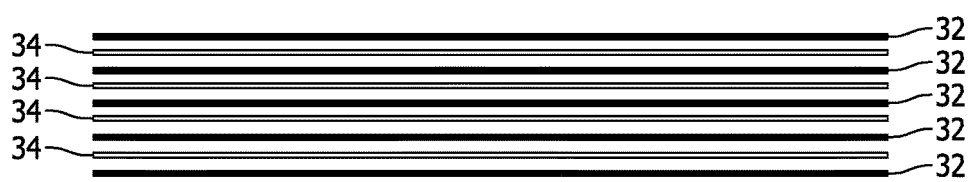
FIG. 4 is a representation of a cross-section of an inner panel of the composite structure.

There are potentially many combinations of the materials listed in the above table that can be used to form the inner panel 24. One possible combination of composite materials is represented in FIG. 4. As represented in FIG. 4, the inner panel 24 is comprised of multiple layers of HDPE sheets 32 separated by graphite sheets 34. The sheets are joined by resins, adhesives or other equivalent means.

The composite materials of the inner panel 24 are chosen so that the inner panel 24 provides a sealed and temperature/humidity controlled environment for humans or animals and/or sensitive equipment and instruments.

The hydrogen content of the composite material chosen to construct the inner panel 24 will also provide extra radiation protection as well as additional thermal insulation and will also increase the structural loads than can be supported by the inner panel 24.

As represented in FIGS. 1 and 2, in the composite structure 10 there is a space or distance 42 provided between the interior surface 16 of the outer panel 12 and the interior surface 28 of the inner panel 24. The distance of the space 42 between the interior surface 16 of the outer panel 12 and the interior surface 28 of the inner panel 24 is in a range of 5 cm to 10 cm. The distance of the space 42 is chosen dependent on the extreme environment the composite structure 10 is exposed to, for example whether the composite structure 10 will be exposed to MMOD projectile impacts.

A standoff or support structure 44 is positioned in the space 42. The support structure 44 is connected to the interior surface 16 of the outer panel 12 and the interior surface 28 of the inner panel 24. The support structure 44 has a lattice configuration comprised of a plurality of walls 46 that are connected to the interior surface 16 of the outer panel 12 and the interior surface 28 of the inner panel 24. The plurality of walls 46 surround a plurality of divided spaces 48 between the interior surface 16 of the outer panel 12 and the interior surface 28 of the inner panel 24 with the plurality of walls 46 separating the plurality of divided spaces 48. In the representation of the composite structure 10 in FIGS. 1 and 2, the plurality of walls 46 separating the plurality of divided spaces 48 have trapezoidal configurations. The configurations of the plurality of walls 46 could be other than the trapezoidal configurations represented in FIGS. 1 and 2, depending on the load and weight requirements of the composite structure 10. The composite materials chosen to construct the support structure 44 can be the same as those used in the construction of the outer panel 12 and/or the inner panel 24. Other combinations of composite materials can also be employed in the construction of the support structure 44.

Figure 5:
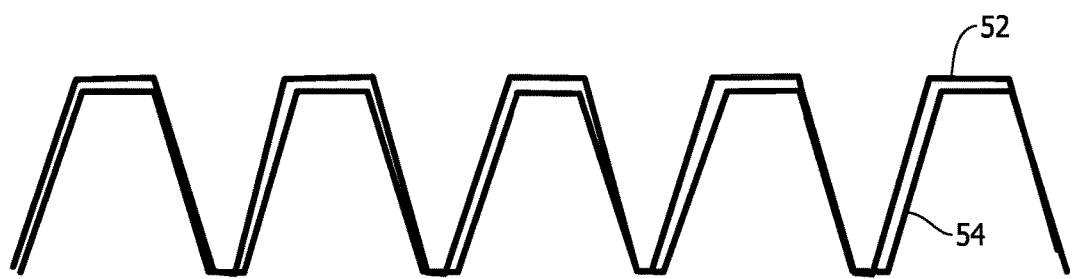
FIG. 5 is a representation of a cross-section of a support structure of the composite structure.

Referring to FIG. 5, a representation of a side view of a portion of the support structure 44 is shown. In FIG. 5 the support structure 44 is constructed of multiple layers of HDPE sheets 52 separated by multiple layers of Spectra Fabric sheets 54, with the layers being joined by resins, adhesives or other equivalent means. The thicknesses of each of the plurality of walls 46 can vary from 0.2 cm to 0.4 cm, or more, depending on the structure loads and weight consideration desired for the composite structure 10.

Figure 6:
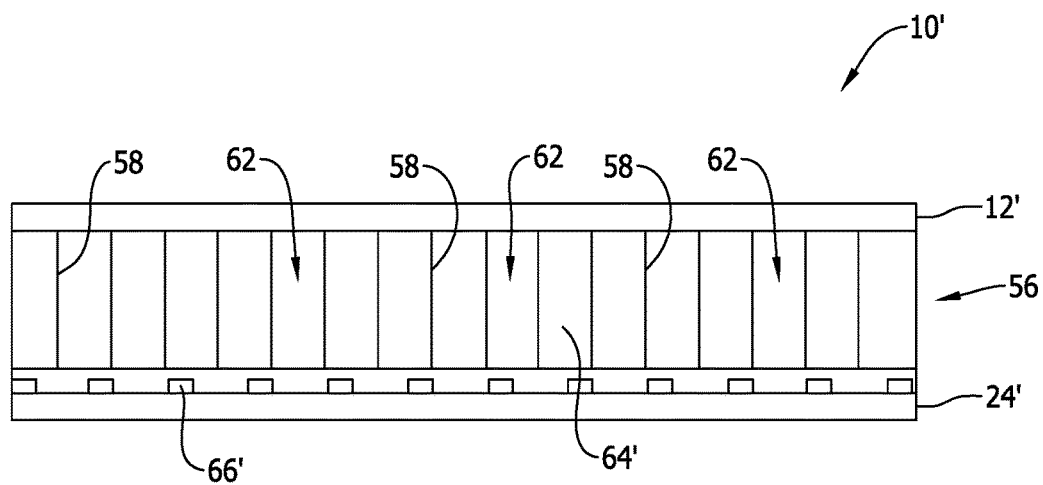
FIG. 6 is a representation of a cross-section view through one side of a portion of a variant embodiment of the composite structure.
Figure 7:
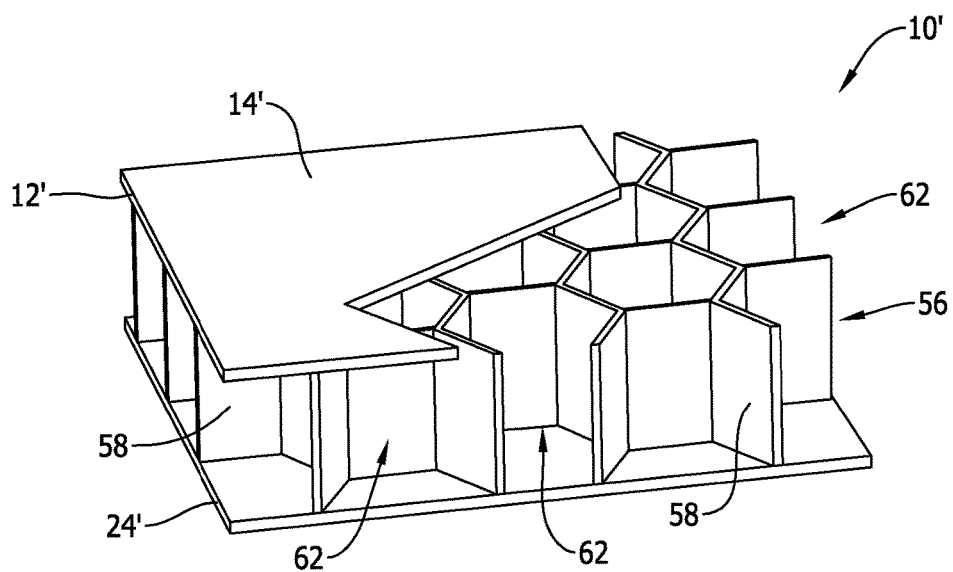
FIG. 7 is a representation of a perspective view of the portion of the composite structure represented in FIG. 6.

As stated above, the configuration of the support structure 44 of the composite structure 10 can be other than the trapezoidal configuration described. Referring to FIGS. 6 and 7, a variation of the composite structure 10' is shown. The construction of the composite structure 10' represented in FIGS. 6 and 7 is basically the same as that represented in FIGS. 1 and 2, and reference numbers used in labeling the component parts of the composite structure 10' represented in FIGS. 6 and 7 are the same as those used in the construction of the composite structure 10 of FIGS. 1 and 2, with the reference numbers followed by a prime (').

The construction of the composite structure 10' represented in FIGS. 6 and 7 differs from that of the previously described composite structure 10 in the configuration of the support structure 56. In the embodiment of the composite structure 10' represented in FIGS. 6 and 7, the support structure 56 has a plurality of walls 58 that are also connected between the interior surface 16' of the outer panel 12' and the interior surface 28' of the inner panel 24'. The wire 66' spirals around the support structure 56. The plurality of walls 58 divide the space 42' into a plurality of divided spaces 62 between the interior surface 16' of the outer panel 12' and the interior surface 28' of the inner panel 24' with the plurality of walls 58 separating the plurality of divided spaces 62. The plurality of walls 58 separating the plurality of divided spaces 62 have honeycomb configurations. The support structure 56 of FIGS. 6 and 7 can be constructed of the same composite materials described above with reference to the support structure 44 of the composite structure 10 of FIGS. 1 and 2.

Returning to the composite structure 10 of FIGS. 1 and 2, a foam 64 is interposed in the space 42 and the support structure 44. The form 64 fills the plurality of divided spaces 48 between the interior surface 16 of the outer panel 12 and the interior surface 28 of the inner panel 24. The foam 64 completely fills the divided spaces 48. The foam 64 can be thermal insulating foam, radiation shielding foam, or both. In the composite structure 10 represented in FIGS. 1 and 2, the foam 64 is pleyethelne/urethelen foam. This same foam could be used in the composite structure 10' of FIGS. 6 and 7 described earlier.

A wire 66 is extended through the space 42. The wire 66 passes through the space 42 between the interior surface 16 of the outer panel 12 and the interior surface 28 of the inner panel 24. The wire 66 could have a cross-section configuration of a conventional wire, or could have a cross-section configuration of a strip or other equivalent cross-section configuration. The wire 66 could be a plurality of wires. The wire 66 has high electrical conductivity and could be a super conductor. As represented in FIGS. 1 and 2, for considerations of weight and safety, the wire 66 is positioned along the interior surface 28 of the inner panel 24. The wire 66 could also be positioned along the exterior surface 14 or the interior surface 16 of the outer panel 12 to provide additional protection from high energy charged particles (ionizing radiation).

Insulation 72 is also provided in the space 42 between the interior surface 16 of the outer panel 12 and the interior surface 28 of the inner panel 24. The insulation 72 is multi-layer insulation. As represented in FIGS. 1 and 2, the insulation 72 extends across the interior surface 28 of the inner panel 24. The insulation 72 could also be positioned across the exterior surface 26 of the inner panel 24. The insulation 72 provides additional thermal insulation to prevent temperature variations through the composite structure 10, and also can be radiation shielding insulation to provide additional radiation protection.

Figure 8:
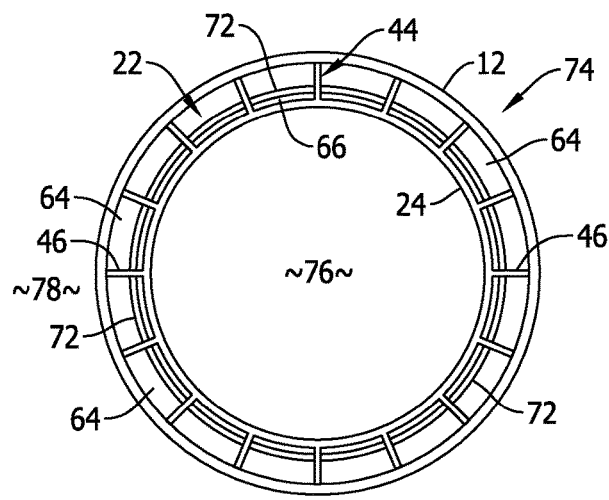
FIG. 8 is a representation of a cross-section of a spacecraft employing the composite structure in its construction.

FIG. 8 is a representation of the composite structure 10 employed in the construction of an aircraft or a spacecraft. FIG. 8 represents a cylindrical cross-section of an enclosed spacecraft. FIG. 12 is a representation of the method of constructing a spacecraft 74 employing the composite structure 10. As represented in FIGS. 8 and 12, in constructing the spacecraft 74, the inner panel 24 of the composite structure 10 surrounds the interior volume 76 of the spacecraft and the outer panel 12 extends around the inner panel 24. The outer panel 12 of the composite structure 10 forms the exterior of the spacecraft and is exposed to the extreme environment 78 that the spacecraft if subjected to when in space. As described earlier, the outer panel 12 is constructed of composite material selected from a group comprising Kevlar 49, fiberglass, boron carbide, Spectra Fiber, Nextel fabric, graphite/epoxy fabric, Spectra Fiber/polyethylene, graphite/epoxy tape, and graphite/Spectra/highdensity polyethylene laminate. The inner panel 24 is constructed of composite materials selected from a group comprising Kevlar 49, fiberglass, boron carbide, Spectra Fiber, Nextel fabric, graphite/epoxy fabric, Spectra Fiber/polyethylene, graphite/epoxy tape, and graphite/Spectra/highdensity polyethylene laminate. In the construction of the spacecraft 74 the space 42 is provided between the outer panel 12 and the inner panel 24. The support structure 44 extends between and connects the inner panel 24 and the outer panel 12 of the composite structure 10. The foam 64 is interposed in the space 22 and the support structure 44. The wire 66 is extended through the space 42 with the wire configured in a helix configuration. The power source 84 is provided in the construction of the spacecraft 74 and is connected to the wire 66. As represented in FIGS. 8 and 12, the wire 66 extends around the interior surface 28 of the inner panel 24 and through the walls 46 of the support structure 44. The multi-layer insulation 72 extends over the wire 66 and between the walls 46 of the support structure 44. The foam 64 extends over the multi-layer insulation 72.

The method of FIG. 12 represents constructing a spacecraft with an inner panel that extends around an interior volume of the spacecraft and an outer panel that extends around the inner panel. Constructing the outer panel of composite material selected from a group comprising Kevlar 49, fiberglass, boron carbide, Spectra Fiber, Nextel fabric, graphite/epoxy fabric, Spectra Fiber/polyethylene, graphite/epoxy tape, and graphite/Spectra/highdensity polyethylene laminate. Constructing the inner panel of composite material selected from a group comprising Kevlar 49, fiberglass, boron carbide, Spectra Fiber, Nextel fabric, graphite/epoxy fabric, Spectra Fiber/polyethylene, graphite/epoxy tape, and graphite/Spectra/highdensity polyethylene laminate. Providing a space between the outer panel and the inner panel. Positioning a support structure in the space and connecting the support structure to the outer panel and the inner panel. Interposing foam in the space and the support structure. Extending wire through the space with the wire configured in a helix configuration. Connecting a power source to the wire.

Figure 9:
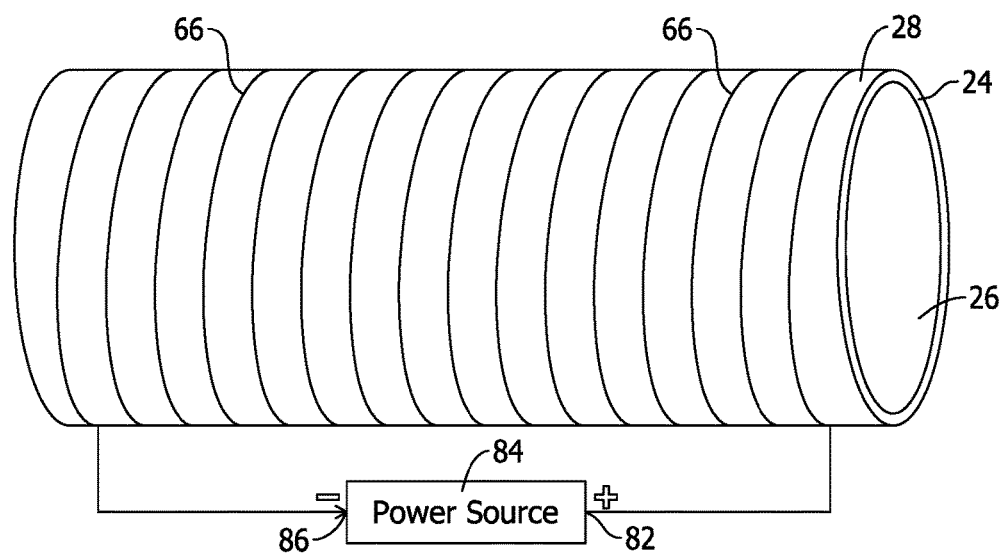
FIG. 9 is a schematic representation of a portion of the composite structure represented in FIG. 8.

Referring to FIG. 9, a schematic representation of the wire 66 extending around the inner panel 24 is represented. As represented in FIG. 9, a first end 82 of the wire 66 is connected to a power source 84, for example a positive terminal of the power source 84. A second end 86 of the wire 66 is connected to the opposite end of the power source 84, for example a negative terminal of the power source 84. The length of the wire 66 extending from the first end 82 to the second end 86 is wrapped in a spiraling or helix configuration around the interior surface 28 of the inner panel 24. The pitch of the spiraling or helix configuration of the wire 66 around the inner panel 24 is determined based on the electromagnetic field strength required from the current passing through the wire 66, the amount of power available from the power source 84, the resistance of the wire 66, and other factors that influence electromagnetic field strength.

Figure 13:
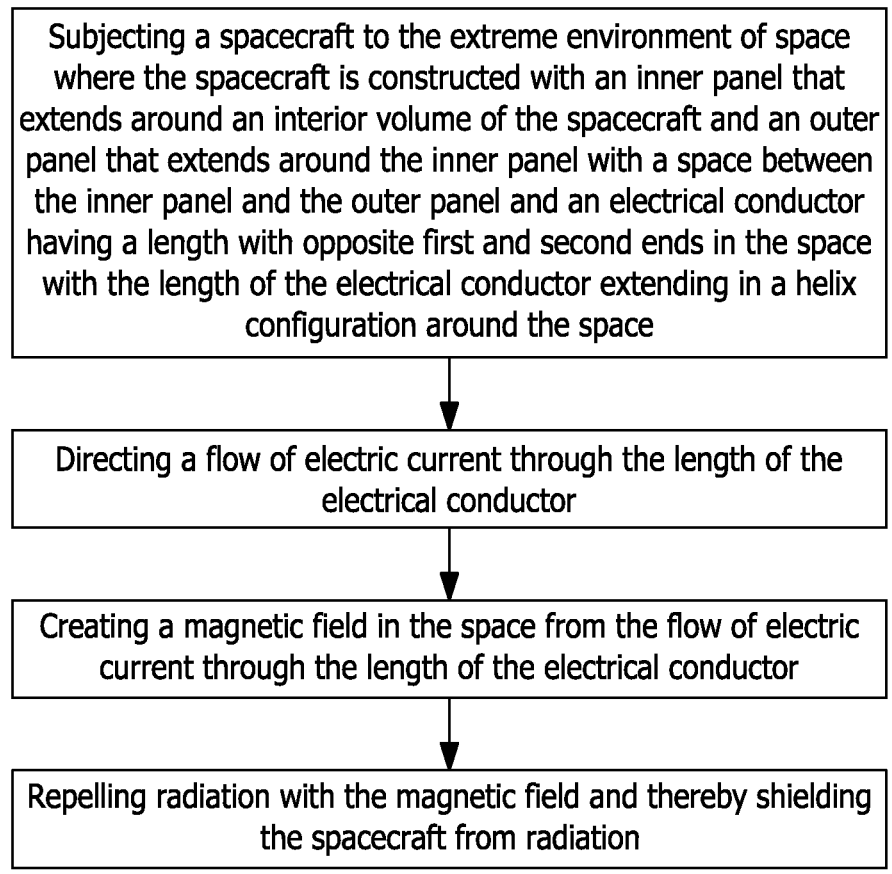
FIG. 13 is a representation of a method of shielding a spacecraft employing the composite structure from radiation.

The wire 66 provides a method of shielding a spacecraft 74 constructed with the composite structure 10 as described above with reference to FIGS. 8 and 12 from radiation. As represented in FIG. 9 and FIG. 13, the spacecraft 74 is constructed with an inner panel 24 that extends around an interior volume 76 of the spacecraft and an outer panel 12 that extends around the inner panel 24 with there being a space 42 between the inner panel and the outer panel. As represented in FIG. 9, the length of the wire 66 is positioned on the inner panel 24 with the length of the wire extending in a spiraled or helix configuration around the inner panel 24. The wire 66 is connected to the power source 84. By directing a flow of electric current from the power source 84 and the first end 82 of the wire 66 to the second end 86 of the wire 66, a magnetic field around the inner panel 24 is created. The magnetic field is created within the space 42 between the outer panel 12 and the inner panel 24. With the spacecraft 74 subjected to the extreme environment 78 of space, the magnetic field created repels radiation and thereby shields the spacecraft 74 represented in FIG. 8 from radiation. This method of shielding the structure of the spacecraft 74 is represented in FIG. 13.

The method of FIG. 13 represents subjecting a spacecraft to the extreme environment of space where the spacecraft is constructed with an inner panel that extends around an interior volume of the spacecraft and an outer panel that extends around the inner panel with a space between the inner panel and the outer panel and an electrical conductor having a length with opposite first and second ends in the space with the length of the electrical conductor extending in a helix configuration around the space. Directing a flow of electric current through the length of the electrical conductor. Creating a magnetic field in the space from the flow of electric current through the length of the electrical conductor. Repelling radiation with the magnetic field and thereby shielding the spacecraft from radiation.

Figure 10:
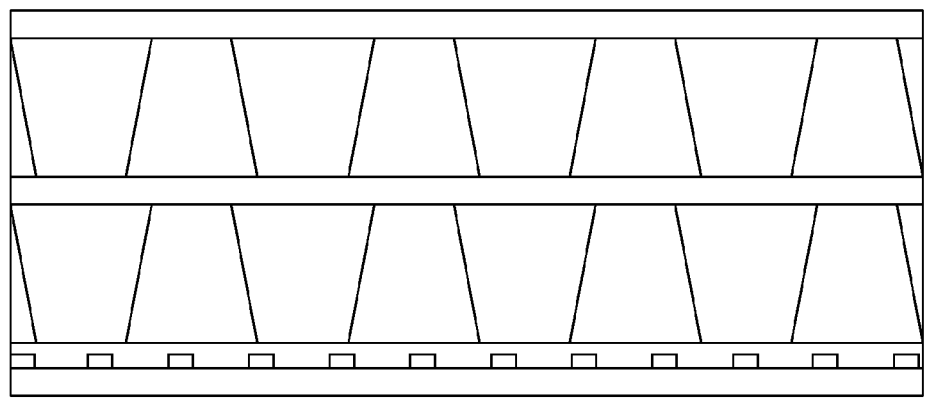
FIG. 10 is a representation of a cross-section view through a portion of a variant embodiment of the composite structure represented in FIG. 1.
Figure 11:
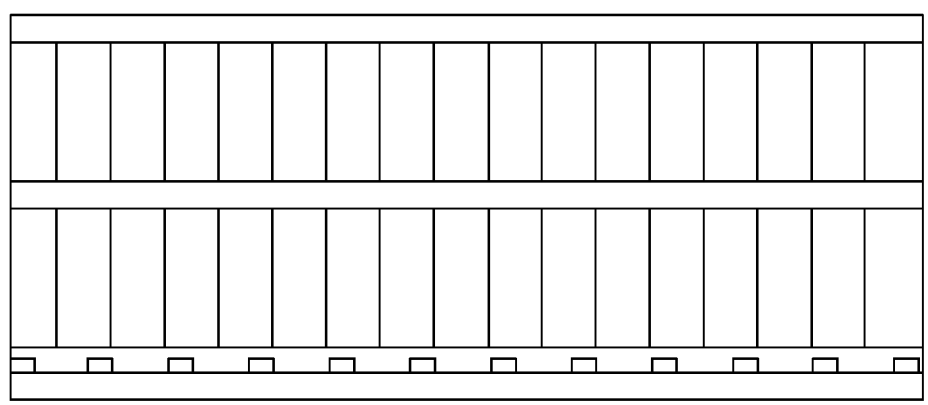
FIG. 11 is a representation of a cross-section view of a portion of a variant embodiment of the composite structure represented in FIG. 6.

In applications of the composite structure 10, where additional strength and protection is required, multiple layers of the composite structure 10 may be employed. FIG. 10 is a representation of layered composite structures 10 of FIGS. 1 and 2, and FIG. 11 is a representation of layered composite structures 10' of FIGS. 6 and 7.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. A composite structure comprising:
    an outer panel, the outer panel being constructed of a composite material, the composite material is comprised of multiple layers of sheets having a hydrogen content that provides radiation protection, thermal insulation and structural strength, the outer panel having a thickness between an exterior surface of the outer panel and an interior surface of the outer panel, the exterior surface of the outer panel and the interior surface of the outer panel being smooth, continuous surfaces that are substantially parallel;
    an inner panel, the inner panel being constructed of a composite material, the composite material is comprised of multiple layers of sheets having a hydrogen content that provides radiation protection, thermal insulation and structural strength, the inner panel having a thickness between an exterior surface of the inner panel and an interior surface of the inner panel, the exterior surface of the inner panel and the interior surface of the inner panel being smooth, continuous surfaces that are substantially parallel;
    a space between the interior surface of the outer panel and the interior surface of the inner panel;
    a support structure in the space, the support structure being connected to the interior surface of the outer panel and the interior surface of the inner panel;
    a foam interposed in the space and the support structure; and,
    a wire extending through the space between the interior surface of the outer panel and the interior surface of the inner panel, the wire having a high electrical conductivity.

2. The composite structure of claim 1, further comprising:
    insulation in the space between the interior surface of the outer panel and the interior surface of the inner panel, the insulation being multi-layer insulation, the multi-layer insulation extending across the interior surface of the inner panel.

3. The composite structure of claim 2, further comprising:
    the insulation being thermal insulation and the insulation being radiation shielding insulation.

4. The composite structure of claim 1, further comprising:
    the wire having a helix configuration that extends through the space between the interior surface of the outer panel and the interior surface of the inner panel.

5. The composite structure of claim 1, further comprising:
the support structure having a lattice configuration comprised of a plurality of walls that are connected to the interior surface of the outer panel and the interior surface of the inner panel, the plurality of walls extending between a plurality of divided spaces between the interior surface of the outer panel and the interior surface of the inner panel with the plurality of walls separating the plurality of divided spaces; and,
the foam filling the plurality of divided spaces between the interior surface of the outer panel and the interior surface of the inner panel.

6. The composite structure of claim 5, further comprising:
the plurality of walls giving each of the plurality of divided spaces a honeycomb configuration.

7. The composite structure of claim 5, further comprising:
the plurality of walls giving each of the plurality of divided spaces a trapezoidal configuration.

8. The composite structure of claim 1, further comprising:
the composite material of the outer panel being selected from a group comprising Kevlar 49, fiberglass, boron carbide, Spectra Fiber, Nextel fabric, graphite/epoxy fabric, Spectra Fiber/polyethylene, graphite/epoxy tape, and graphite/Spectra/high density polyethylene laminate; and,
the composite material of the inner panel being selected from a group comprising Kevlar 49, fiberglass, boron carbide, Spectra Fiber, Nextel fabric, graphite/epoxy fabric, Spectra Fiber/polyethylene, graphite/epoxy tape, and graphite/Spectra/high density polyethylene laminate.

9. The composite structure of claim 1, further comprising:
the thickness of the outer panel being in a range of 0.2 cm to 2.0 cm; and,
the thickness of the inner panel being in a range of 0.2 cm to 2.0 cm.

10. The composite structure of claim 9, further comprising:
the space between the interior surface of the outer panel and the interior surface of the inner panel being in a range of 5 cm to 10 cm.

11. A composite structure comprising:
an outer panel, the outer panel being constructed of a composite material, the composite material is comprised of multiple layers of sheets having a hydrogen content that provides radiation protection, thermal insulation and structural strength, the outer panel having a thickness between an exterior surface of the outer panel and an interior surface of the outer panel, the exterior surface of the outer panel and the interior surface of the outer panel being smooth, continuous surfaces and being substantially parallel;
an inner panel, the inner panel being constructed of a composite material, the composite material is comprised of multiple layers of sheets having a hydrogen content that provides radiation protection, thermal insulation and structural strength, the inner panel having a thickness between an exterior surface of the inner panel and an interior surface of the inner panel, the exterior surface of the inner panel and the interior surface of the inner panel being smooth, continuous surfaces and being substantially parallel;
a space between the interior surface of the outer panel and the interior surface of the inner panel;
a support structure in the space, the support structure being connected to the interior surface of the outer panel and the interior surface of the inner panel, the support structure having a lattice configuration comprised of a plurality of walls that are connected to the interior surface of the outer panel and the interior surface of the inner panel, the plurality of walls extending between a plurality of divided spaces between the interior surface of the outer panel and the interior surface of the inner panel with the plurality of walls separating the plurality of divided spaces;
a foam filling the plurality of divided spaces between the interior surface of the outer panel and the interior surface of the inner panel; and,
a wire extending through the space between the interior surface of the outer panel and the interior surface of the inner panel, the wire having high electrical conductivity.

12. The composite structure of claim 11, further comprising:
insulation in the space between the interior surface of the outer panel and the interior surface of the inner panel, the insulation being multi-layer insulation, the multi-layer insulation extending across the interior surface of the inner panel.

13. The composite structure of claim 12, further comprising:
the insulation being thermal insulation and the insulation being radiation shielding insulation.

14. The composite structure of claim 11, further comprising:
the wire having a helix configuration that extends through the space between the interior surface of the outer panel and the interior surface of the inner panel.

15. The composite structure of claim 11, further comprising:
the plurality of walls giving each of the plurality of divided spaces a honeycomb configuration.

16. The composite structure of claim 11, further comprising:
the plurality of walls giving each of the plurality of divided spaces a trapezoidal configuration.

17. The composite structure of claim 11, further comprising:
the composite material of the outer panel being selected from a group comprising Kevlar 49, fiberglass, boron carbide, Spectra Fiber, Nextel fabric, graphite/epoxy fabric, Spectra Fiber/polyethylene, graphite/epoxy tape, and graphite/Spectra/high density polyethylene laminate; and,
the composite material of the inner panel being selected from a group comprising Kevlar 49, fiberglass, boron carbide, Spectra Fiber, Nextel fabric, graphite/epoxy fabric, Spectra Fiber/polyethylene, graphite/epoxy tape, and graphite/Spectra/high density polyethylene laminate.

18. The composite structure of claim 11, further comprising:
the thickness of the outer panel being in a range of 0.2 cm to 2.0 cm; and,
the thickness of the inner panel being in a range of 0.2 cm to 2.0 cm.

19. The composite structure of claim 18, further comprising:
the space between the interior surface of the outer panel and the interior surface of the inner panel being in a range of 5 cm to 10 cm.

20. A method of constructing a composite structure of a spacecraft comprising:

constructing a spacecraft with an inner panel that extends around an interior volume of the spacecraft and an outer panel that extends around the inner panel;

constructing the outer panel of composite material selected from a group comprising Kevlar 49, fiberglass, boron carbide, Spectra Fiber, Nextel fabric, graphite/epoxy fabric, Spectra Fiber/polyethelene, graphite/epoxy tape, and graphite/Spectra/high density polyethylene laminate, the composite material being multiple layers of sheets having a hydrogen content that provides radiation protection, thermal insulation and structural strength;

constructing the inner panel of composite material selected from a group comprising Kevlar 49, fiberglass, boron carbide, Spectra Fiber, Nextel fabric, graphite/epoxy fabric, Spectra Fiber/polyethylene, graphite/epoxy tape, and graphite/Spectra/high density polyethylene laminate, the composite material being multiple layers of sheets having a hydrogen content that provides radiation protection, thermal insulation and structural strength;

providing a space between the outer panel and the inner panel;

positioning a support structure in the space and connecting the support structure to the outer panel and the inner panel;

interposing foam in the space and the support structure; and, extending wire through the space with the wire configured in a helix configuration; and, connecting a power source to the wire.

21. A method of shielding a spacecraft from radiation comprising:

subjecting a spacecraft to an extreme environment of space where the spacecraft is constructed with an inner panel extending around an interior volume of the spacecraft and an outer panel extending around the inner panel with a space between the inner panel and the outer panel;

constructing the inner panel of composite material comprised of multiple layers of sheets having a hydrogen content that provides radiation protection, thermal insulation and structural strength;

constructing the outer panel of composite material comprised of multiple layers of sheets having a hydrogen content that provides radiation protection, thermal insulation and structural strength;

positioning an electrical conductor haying a length with opposite first and second ends in the spacecraft with the length of the electrical conductor extending in a helix configuration from the first end of the electrical conductor to the second end of the electrical conductor around the spacecraft;

directing a flow of electric current through the length of the electrical conductor from the first end of the electrical conductor to the second end of the electrical conductor;

creating a magnetic field in the space by the flow of electric current directed through the length of the electrical conductor; and, repelling radiation with the magnetic field created in the space thereby shielding the structure from radiation.

* * * * *

UNITED STATES PATENT AND TRADEMARK OFFICE
CERTIFICATE OF CORRECTION

PATENT NO. : 10,442,559 B2
APPLICATION NO. : 15/226219
DATED : October 15, 2019
INVENTOR(S) : Jian Dong and Daveed Moayyed Hussain It is certified that error appears in the above-identified patent and that said Letters Patent is hereby corrected as shown below:

Column 12 In Claim 21, in Line 17, "haying" is replaced with --having--.

Signed and Sealed this
Twenty-sixth Day of November, 2019

Andrei Iancu
*Director of the United States Patent and Trademark Office*